United States Patent

[11] 3,592,402

[72] Inventor Johan Eric Hayden Westberg
Lidingo, Sweden

[21] Appl. No. 723,053
[22] Filed Apr. 22, 1968
[45] Patented July 13, 1971
[73] Assignee AGA Aktiebolag
Lidingo, Sweden
[32] Priority Apr. 21, 1967, Sept. 26, 1967, Apr. 3, 1968
[33] Sweden
[31] 5,664/67, 13,167/67 and 4,418/68

[54] TAPE WINDING APPARATUS FOR RECORDING AND/OR REPRODUCING OF INFORMATION ON AN ENDLESS TAPE
10 Claims, 12 Drawing Figs.

[52] U.S. Cl. 242/55.16
[51] Int. Cl. B65h 65/02
[50] Field of Search 242/55.16; 352/128

[56] References Cited

UNITED STATES PATENTS 1,316,109 9/1919 Recke 242/55.16
1,759,024 5/1930 Selbach 242/55.16

FOREIGN PATENTS 473,442 3/1929 Germany 242/55.16

OTHER REFERENCES

IBM TECHNICAL BULLETIN Vol. 3, No. 6; Nov. 1960, p.11 (352/126)

*Primary Examiner*—Stanley N. Gilreath
*Assistant Examiner*—Werner H. Schroeder
*Attorney*—Larson, Taylor & Hinds

ABSTRACT: The invention relates to a tape-winding device for moving a tape in a single direction relative to means for recording and/or reproducing information on said tape. The tape is endless and increased tape-running time is provided by a pair of spool means. The tape is wound in a doubled-back or bifilar manner on a first spool. A first section of tape is fed therefrom to the information recording and/or reproducing means and from there to the second spool. The second section of tape is wound directly onto the second spool element. After the tape is entirely unwound from the first spool and onto the second spool in this manner, the spool directions are reversed and the second tape section is unwound from the second spool to the information recording and/or reproducing means and from there to the first spool. The first tape section is unwound directly from the second spool to the first spool and when the second spool is empty, the spool directions are again changed and a cycle begins as before. A tape-advancing means continuously drives the tape in one direction relative to the recording and/or reproducing means. When a spool becomes empty, the spools change direction and, at that time, a loop of tape must be fed into engagement from the full spool to the empty spool for winding thereon. According to the present invention, the tape loop is guided to the empty spool by an airstream. The airstream may also be used to change the direction of rotation of the spools.

TAPE WINDING APPARATUS FOR RECORDING AND/OR REPRODUCING OF INFORMATION ON AN ENDLESS TAPE

The present invention relates to tape-winding apparatus for recording and/or reproducing information on an endless tape, which is adapted to be alternately wound in doubled-back condition onto a pair of spools and on winding off from one of the spools, one section of the double-back tape being adapted to be transferred direct to the other spool and the other section of the tape via recording and/or reproducing means to the other spool, the tape being adapted in connection with the change of spools to be acted on by control means.

The invention is characterized in that the direction of rotation of the two spools is adapted to be influenced on the one hand by driving means tending always to drive the two spools in the same direction via friction means and, on the other hand, by drive rollers for feeding the tape.

To facilitate automatic attachment of the band to the empty spool when it has been completely unwound from one of the spools, the apparatus can preferably be provided with control means for the loop of tape formed in connection with the change of the spools. The control means may be in the form of two guide members mechanically connected to each other and operating each section of the tape always going through the guide members. When one section of the tape works upon the guide member cooperating with sensing means, it causes undelayed disengagement of the other spool from the drive means and an engagement after a certain time delay of the drive means with the first spool as well as an activation of an attaching member arranged in cooperation with the first spool for detachably fastening a loop of the tape formed during the delay interval to said spool.

Another example of control means included in the invention is the apertures in the apparatus for admitting a stream of air for directing the loop of tape formed in connection with the change towards the contact surface for the tape provided on the empty spool, apertures for the air stream being provided on the contact surface as well as on the lower end surface of the spool and the tape being detachably fastened to the spool by the airstream so as to be caught by the spool when it rotates.

In an apparatus with air for directing the tape, the stream of air can be with advantage be used for changing the direction of the spools too. The airstream may be adapted to work upon a bowl-shaped member having a lid provided underneath the apertures in the lower end of each of the spools. The lids are attached to a lever with a mechanical coupling provided between the lever and a pair of drive wheels, for changing the direction of the spools.

To make possible a safe automatic attaching of tape to the spools, they can be provided with attachment devices adapted for the tape. By connecting a catch member swingable with the first spool and adapting it to swing into the operative position when the spool is connected to the drive means at the end of the time delay period, the tape is safely attached to the spool.

By another example of an attaching member of tape to the spools the fastening means of the spool comprises a number of fingers attached to one of the end surfaces of the spool and which are arranged in such a way as to permit the tape to enter between them and the center of the spool and to form at the same time contact surface onto which the tape can be wound. This can be obtained by letting one of the end plates, preferably the one provided with the fingers, to be in a sloping position relative to the axis of the spool when the latter is empty.

Embodiments of the invention will be described with reference to the attached drawings, in which FIGS. 1 to 3 show an embodiment of the invention at different moments, FIG. 4 shows an arrangement for driving the spools, FIG. 5 shows another embodiment of the invention, FIG. 6 shows a section along the line I of FIG. 5.

Figure 1:
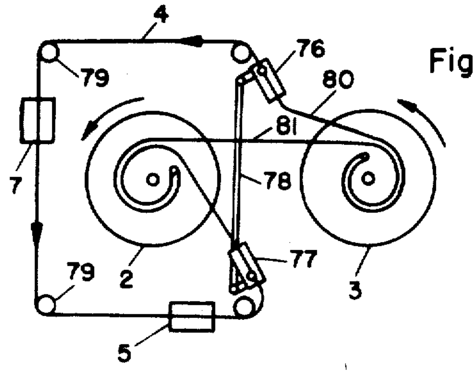
Figure 2:
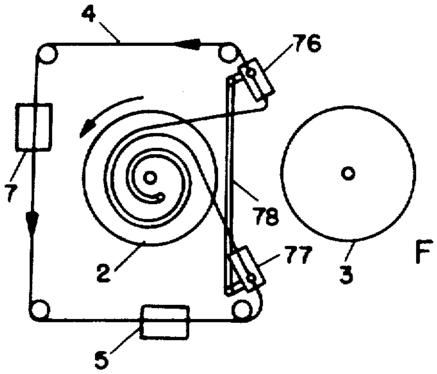
Figure 3:
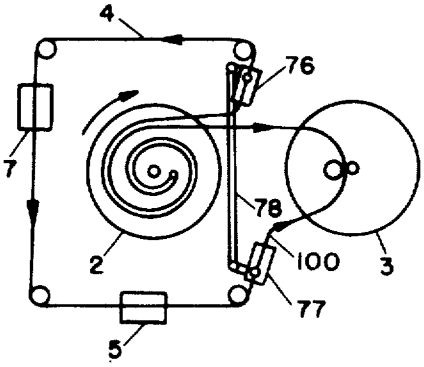

In FIGS. 1 to 3 there is shown a tape 4, spools 2 and 3 for winding the tape thereon, recording and/or reproducing means 7, transfer means 5 for the tape, sensing means 76 and control means 77 for the tape. The sensing means 76 and the control means 77 are connected via a rod 78. Guide members 76 and 77 are arranged between the spools with a distance between the guide members greater than the diameter of the spools and guide member 76 is adapted to swing on shaft 78 parallel to the plane of the tape when the same has been completely unwound from the first spool and is stretched by the driving of the other spool together with the transfer of the tape by the transfer means 5. The other guide member 77 is swingable by the mechanical connection to guide the loop of the tape formed adjacent the full spool into engagement with the empty spool. Also shown in FIGS. 1 to 3 are guides rollers 79 for guiding the tape through recording and/or reproducing means 7 and transfer means 5. The endless tape 4 may be adapted for any type of recording, such as optical, magnetic or other.

At the moment illustrated in FIG. 1, the tape is being unwound from the spool 3, it being assumed that the tape has been wound onto the spool 3 in doubled-back condition and detachable therefrom. The tape is controlled so as to make one section 30 thereof pass through sensing means 76 and then through the recording and/or reproducing means 7 and the transfer means 5 as well as the control means 77 to the other spool 2, where this section 80 of the tape is wound up together with the other section 81 which is being unwound from the spool 3, and which is transferred directly from on spool to the other.

When the tape has been completely unwound from one of the spools, such as the spools 3, as shown in FIG. 2, the tape 4 can be disengaged from the spool 3. During the subsequent winding up of the tape onto the spool 2 and the simultaneous forward feed caused by the transfer means 5, the section of the tape between the spool 2 and the sensing means 76 is tensioned, which leads to the sensing means 76 being rotated clockwise to the position shown in FIG. 3. The sensing means 76 then actuated the drive means for the spools 2 and 3 via contact members of a type known per se, which are not shown on the drawing, whereby the spool 2 is immediately disengaged from the drive means and spool 3 is brought into engagement therewith after a certain delay.

Figure 4:
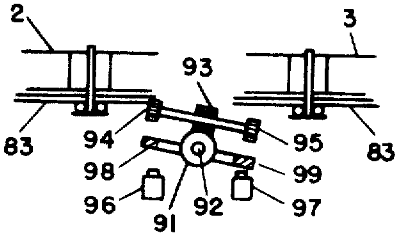

The drive means for driving the spools 2 and 3 are shown in FIG. 4 as comprising an electric motor 91, which is rotatably supported on a shaft 92. The motor 91, via a gearing such as a helical gear 93, drives friction wheels 94 and 95, which can be brought into engagement with one of the spool holders 83 by the turning of the motor about the shaft 92. In the present instance, this swinging movement of the motor is brought about by a pair of electromagnets 96 and 97, which can be made to attract corresponding armatures 98 and 99 connected with the motor. The position of the motor 91 shown in FIG. 4 is assumed to correspond to the moment illustrated in FIG. 1, when the spool 2 is being driven by the motor. The swinging of the sensing means 76 as shown in FIG. 3, through the action of the contact members referred to above, interrupts the current of the electromagnet 97, thereby causing immediate cessation of the driving of the spool 2. After a certain delay, which may be brought about by well-known means, the electromagnet 96 then has current applied to it, causing it to retract its armature 98, and the friction wheel 95 then starts driving the spool 3.

During the period of delay referred to above, i.e. where neither of spools 2 and 3 is in operative engagement with the motor 91, the transfer means 5 continue feeding the tape through the recording and/or reproducing means 7. This causes the spool 2 to change its direction of rotation and one of the sections of the doubled-back tape wound onto the spool 2 to be pulled in through the sensing means 76 on onto the means 7. The change in direction of the spool 2 results in the other section of the tape being unwound as well, and since the tape is at the same time being fed through the control means 77, there is formed during this delay period a loop 100 which enters the spool 3. The control means 77 has then turned clockwise to the position shown in FIG. 3 on to the swinging movement performed by the sensing means 76 and the pull exerted on the rod 78. The swinging of the control means 77 therefore contributes to the dependent guiding of the loop of tape 100 towards the spool 3.

At the end of the delay period, the electromagnet 96 is activated and the friction wheel 95 starts driving the spool 3. The tape is then tensioned in the manner described above between the sensing means 76 and the spool 3. This causes the sensing means 76 to swing counterclockwise to the position shown in FIG. 1, resulting in disconnecting of the motor 91 from the spool 3 as well as the swinging of the control means 77 into the position shown in FIG. 1. Finally, after a certain delay, the motor 91 is again brought into operative engagement with the spool 2.

Figure 5:
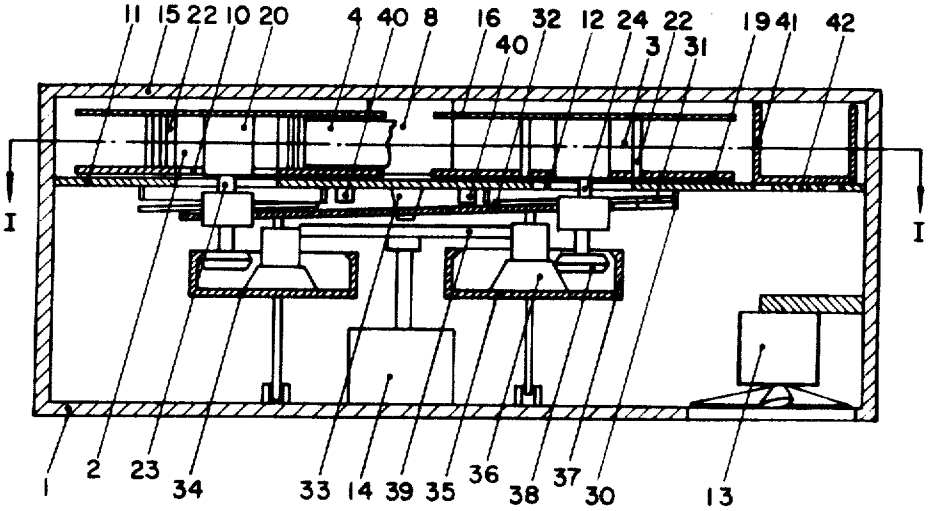
Figure 6:
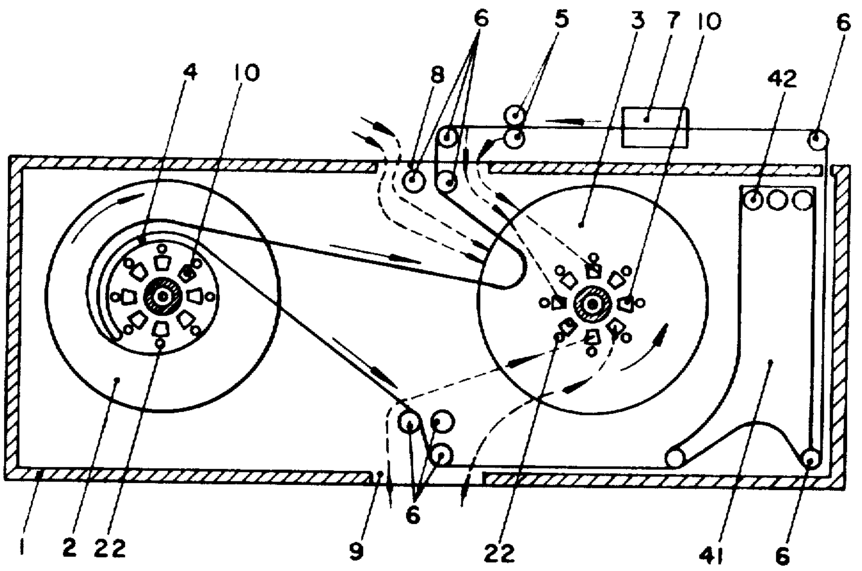
Figure 8:
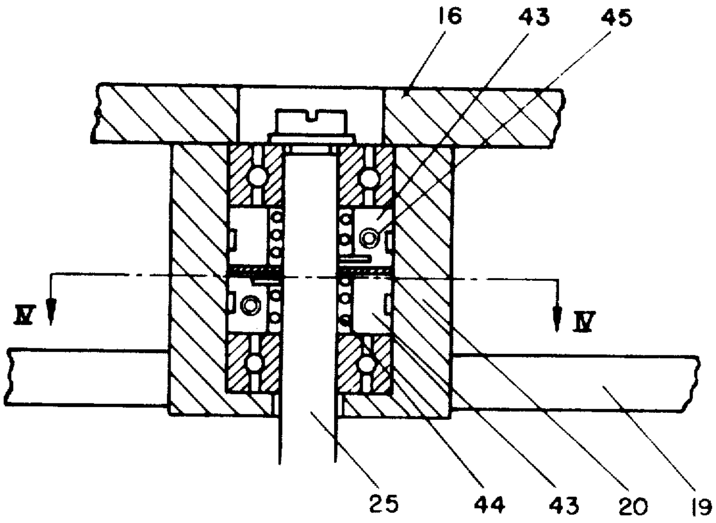
FIG. 8 shows a detail of the hub of the tape spool for the apparatus shown in FIG. 5.
Figure 9:
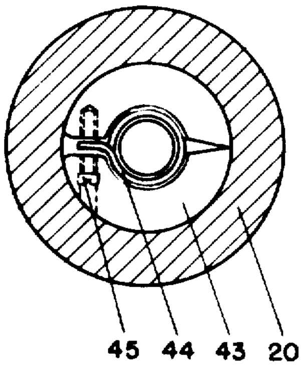
FIG. 9 shows a section taken on line IV of FIG. 8, FIGS. 10 and 11 show a tape spool and an attaching member for the tape as well as means for controlling the same.

In FIGS. 5 and 6 there is shown a frame 1, in which are disposed a pair of spools 2 and 3 for winding a tape 4. For driving the spools, drive means 14 are provided. The drive means 14 can be connected direct to the shafts 23 and 24 of the spools 2 and 3, always driving the shafts 23 and 24 in one and the same direction. The hubs 20 of the spools will in this case be furnished with some sort of friction means, as shown in FIGS. 8 and 9. The direction of rotation of the spools is then determined by two factors: first, the direction of rotation of the shafts 23 and 24 and, second, by the direction of feed of the tape 4, which is determined by drive rollers 5 arranged outside of the frame 1. Recording and/or reproducing means 7 and guide rollers 6 are placed outside the frame 1 too. Another way of driving the spools 2 and 3 which is less harmful to the tape, is shown in FIG. 5. The drive means 14 is connected to the shafts 23 and 24 via drive wheels 34 and 35, which are regulated by an airstream as mentioned below.

The frame 1 is provided with apertures 8 and 9, through which air is sucked into the apparatus when one of the spools is empty. The spools 2 and 3 comprise a pair of endplates 16 and 19, between which a plurality of intermediate members 22 are attached so as to serve as a contact surface for the tape 4. In the lower endplates 19 there are a number of apertures 10 disposed between the intermediate members and the hub 20 of the spool. When the tape is wound onto the spool, it will be placed in contact with the intermediate members 22 and will then shut off the connection between the room inside these members and the room surrounding the spools. Provided in the bottom plate 11 underneath the spools 2 and 3 are a pair of apertures 12 and around each one of these there is a bowl-shaped member 30, having a removable lid 31. The two lids 31 are attached to a lever 32 a fulcrum for which is provided at 33 in the bottom plate 11 between the two lids 31. Magnets 40 are provided underneath the bottom plate 11 for locking the lever 32 in one of the terminal positions. Mechanically coupled to lever 32 are the shafts of the drive wheels 34 and 35. The opposite ends of the shafts are journaled in such a way as to permit upward and downward movement. Each drive wheel 34 and 35 has two drive elements, one of which is in the form of a conical hub 36 and the other of an inclined ring 37. A drive member 38 is provided on each of the shafts 23 and 24 and engages one of the drive elements 36 and 37. Drive member 38 comprises a wheel having a pair of conical parts which is adapted to contact one of the drive elements, depending on whether the drive wheel is in the upper or lower position. The drive wheels 34 and 35 are driven always in the same direction by drive means 14 via members 39. Also provided in frame 1 are a fan 13 and tape-tensioning means 41 comprising a box-shaped device in the interior of which holes 42 are provided.

In the moment illustrated in FIG. 6 the tape 4 is unwound from the spool 3, onto which the tape has been wound in doubled-back condition and loosely attached to the spool. When the spool 3 is unwound, it is caused to rotate in the direction, as shown in FIG. 6. The apertures between the intermediate members 22 and the spool 3 are then uncovered. In the bottom plate 11 provided underneath the spools 2 and 3, there are additional apertures as shown in FIG. 5 of a diameter substantially equal to that of the rotational figure generated by the apertures 10. At this moment, the tape 4 is wound up on the spool 2 and therefore covers the apertures between the members 22 of that spool, and the additional aperture 12 provided underneath the spool therefore has no connection with the room outside the tape 4 either. In cooperation with the additional apertures 12 the fan 13 creates a subpressure underneath the plate 11. When the tape 4 has been unwound from one of the spools, an airstream is generated, as shown with dotted arrows in FIG. 6, which extends from the apertures 8 and 9 through the apertures 10 and further onwards through the additional apertures 12 into the surrounding space.

Since the whole of the tape 4 has been unwound from the spool 3, the part of the tape which is fed through the means 7 must now be taken from the spool 2. The spools 2 and 3 are then caused to rotate in the opposite direction. This causes the other part of the tape 4 wound onto the spool 2 to form a loop, which is separated from the spool. The airstream entering through the aperture 8 catches the loop and exerts a push on one side thereof as well as a suction on the other side. As also the spool 3 rotates in new direction, as described above, and owing to the suction existing at the center of the spool, the tape will follow the rotation of the spool 3 and be loosely attached to the same. The tape 4 will therefore be wound onto the spool 3 until all of the tape has been wound up, whereupon it will be automatically transferred to the spool 2 in the manner described above.

When the airstream is generated through the empty spool (in this case, spool 3) and passes through the aperture 12 and acts on the lid 31. The force acting on lid 31 is therefore a strong downward force which overcomes the force of the right-hand magnet 40. The lever 32 will then snap into its other position, where it is held by the left-hand magnet 40. The coupling of the drive wheels 34 and 35 to the lever 32 causes the wheel 35 to be pushed downward and the wheel 34 to be pulled upward. The drive members 38 of the spools will then switch over to the other drive phase. This means that the drive means 38 of the spool 3 switches from the hub 36 to the ring 37 and the direction of rotation has thus been changed. This change in direction takes place in good time before the tape is returned to the spool. When the tape 4 has been attached to the spool 3 it is wound up on the same and is wound off from the spool 2. At the moment when the spool 2 is empty, a corresponding switch in direction of rotation of the spools is performed as was described with reference to the spool 3.

For the tensioning of the parts of the tape, in addition to the tensioning means 41 acted on by the airstreams, there may also be provided for the winding-up spool to tend to rotate at higher speed than the winding-off spool. A simple manner of providing for this is to make the hub 36 have a diameter which is in a certain ratio to that of the ring 37, such as 1:2.

The FIG. 5 embodiment of the apparatus is provided with a hood 15, which is however not indispensible. If the spools as well as the guide rollers are located sufficiently close to each other, the loop formed will still be sucked towards the empty spool.

Figure 7:
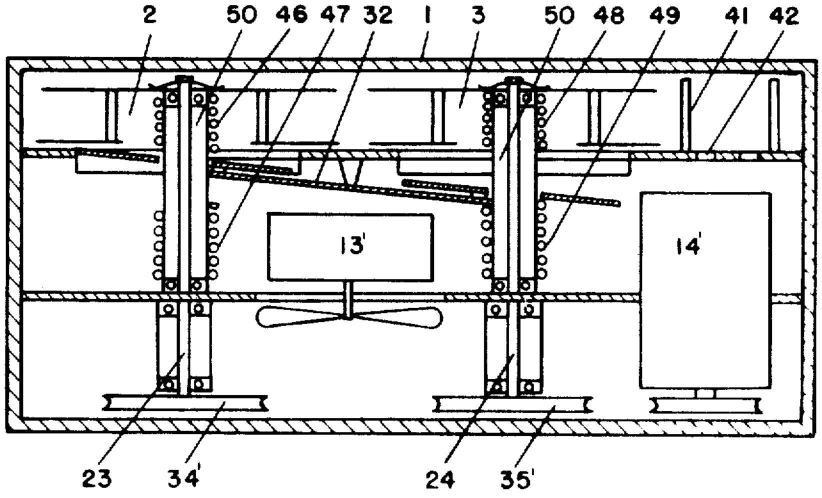
FIG. 7 shows a further embodiment of the apparatus.

FIG. 7 shows further embodiment of the apparatus according to the invention, details corresponding to those in earlier figures, having the same reference numbers. The FIG. 7 apparatus differs from the embodiments described chiefly in that the lever 32 is selectably mechanically connectable to a number of torsion springs 46, 47, 48 and 49 surrounding the prolonged hub 50 of the spools and coupled thereto at one of their ends.

Owing to the presence of torsion springs 46 and 47 connected to each hub 50, the upper end of the spring 46 being connected to the hub 50 as well as the lower end of the spring 47, the direction of the spool is subject to influence from the lever 32. The lever has two positions, in one of which it catches the lower part of the upper spring 46 and the upper part of the lower spring 49. A corresponding catching of the springs 47 and 48 is obtained when the lever 32 is in the other positon. The motor 14 always rotates in the same direction, just as the pulleys 34' and 35' and the shafts 23 and 24 by means of a drive belt, not shown. The shafts always want to drive the spools 2 and 3 in the same direction by friction means. However, the tape is always fed in one direction through the reproducing means, which has influence of the direction of the spools, too.

In one moment the spool 2 rotates anticlockwise and the spool 3 clockwise, compare FIG. 6, and the tape is unwound from the spool 3. When the tape is unwound the direction of the spools will be changed. This is done by the airstream motivated by fan 13' working upon the lever 32, which rakes the position shown in FIG. 7. The lever 32 blocks the springs 46 and 49. The spring will be set by the action of the spool 3. The clockwise rotation of the spool 3 is stopped and energy is stored in the spring 49. This energy initiates an anticlockwise rotation of the spool 3. In the same way the direction of the spool 2 is changed by the spring 46.

The length of the torsion springs is adapted to provide a suitable torque for winding-up or winding-off of the tape. In the embodiment of FIG. 7 a dependent device is obtained with much simpler driving means than that of the above-described apparatus.

As mentioned above, when describing the apparatus shown in FIGS. 5 and 6 it is suitable to provide friction means for the hubs of the spools to make possible smooth movement of the tape. FIGS. 8 and 9 show a detail of a spool. Between the end plates 16 and 19 it is provided a hub 20, in which there are provided a pair of divided rings 43 one above the other and surrounding the shaft 23. Between the rings and the shaft, a pair of helical springs 44 are provided as catch members gripping on the shaft. Owing to the coupling of the springs to the corresponding ring at the other end, there is provided one friction means for each direction of rotation. With the aid of a tensioning device 45 provided in each ring, any desired contact force con be adjusted for, so as to provide for different values of torque. As a matter of fact, when the tape is being wound on or off, only a low value of torque is required, whereas a much higher value is required when the spools are stopped or accelerated in connection with a change in direction of rotation.

Figure 10:
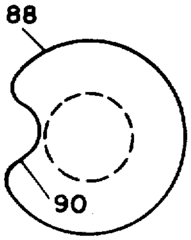
Figure 11:
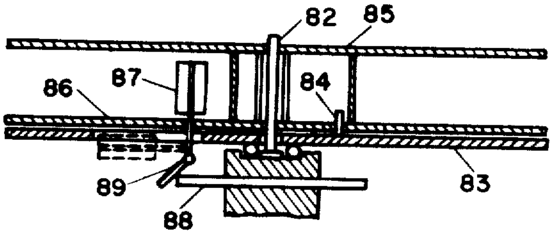

The spools are supported by similarly constructed spool holders being illustrated in FIGS. 10 and 11. As shown in FIGS. 10 and 11 the holder may comprise a spool holder 83 rotatable on a fixed shaft 82 and carrying a pin 84 which passes through a corresponding hole in the central portion 85 of the spool 2. The holder 83 and one endplate of the spool 2 also are provided with a hole 86, through which an attaching member 87 can swing upwards from an inoperative position shown on the drawing in dashlines into an operative position shown in full-drawn lines. The upward and downward swing of the attaching member 87 is controlled by a fixed cam disc 88, a control arm 89 being connected with the attaching member and engaging the cam disc. Positive engagement of the control arm 89 with the cam disc 88 may be obtained in well-known manner by a spring acting on the control arm, for instance a helical spring surrounding the shaft on which the attaching member swings. The cam disc of each spool is provided with a notch 90 directed towards the other spool and of such a shape as to allow downward swinging of the attaching member 87 in that position of the spool.

Figure 12:
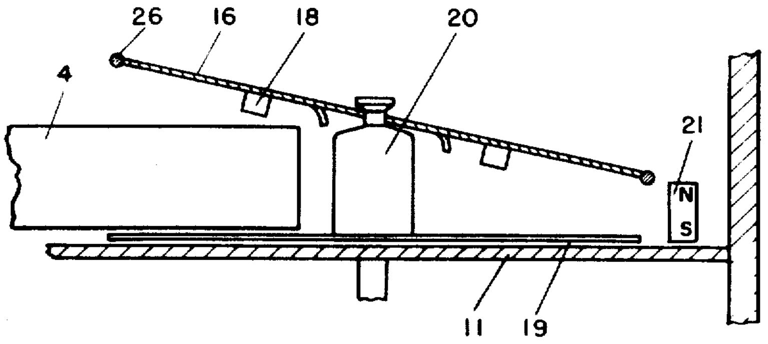
FIG. 12 shows a detail of the apparatus with a tape spool with another example of an attaching member.

The endplate 16 of a spool shown in FIG. 12 is another example of an embodiment of an automatic attaching means for the tape 4. A number of fingers 18 are placed on the plate 16 and have their forward ends bent downwardly towards the lower endplate 19 of the spool. Owing to the fact that the upper endplate 16 is tiltable on the hub 20 of the spool, it can be made to tilt downwards under the influence of an arrangement disposed within the frame in the manner shown in FIG. 12. When the spool is empty, the upper endplate 16 will therefore be in tilted position, which makes it possible for the loop 4 coming from the other spool to enter inside one or more of the fingers 18. In this way, the loop is made to participate in the rotation of the spool and is brought to the other side of the same, where, owing to the tilt of the plate 16, there is less room between the endplates 16 and 19. Since the width of the tape is larger than this room, the plate 16 is forced upwards to be in horizontal position and the tape is thus securely fastened to the spool. In a corresponding manner, the spool will open up when the tape is wound off and the loop is to be detached from the spool.

The arrangement disposed within the frame 1 can preferably comprise one or more magnets 21, if the endplate 16 is partly or entirely made up of magnetic material. In FIG. 12 the endplate is provided with a ring 26 of such material around the circumference. Other solutions are possible such as a resilient plate attached to the frame 1 and contacting one side of the endplate 16.

The invention described causes one half of the length of tape to pass through the recording and/or reproducing means when the tape is being wound up on the spool, whereupon the other half of the tape is passed through these units when the tape is wound onto the other spool.

If the tape is of the type serving for optical recording, i.e. in the case of a motion picture film, the film is therefore ready for an immediate rerun without any rewinding or reversal thereof being required. The same thing is true if the recording is of the magnetic type, the tape being then either a video or a sound tape.

If the tape is of the sound variety having a plurality of tracks, the process comprising winding up on the two spools results in one of the tracks having been played off. A switching to another track can then be made either manually or automatically. In this way, a continuous playoff of all the tracks of the tape can be realized, which is equivalent to a very long uninterrupted time of play. Alternatively, for a certain predetermined performance time, it is possible to use a shorter tape, which may, among other things, have the advantage that a certain item of a recorded program can easily be located without time-consuming playing off in one or the other direction.

I claim:

1. Tape-winding apparatus for moving an endless tape relative to information conveying means for recording and/or reproducing information on said tape comprising: tape-advancing means to move said tape in one direction relative to said information conveying means; first driven spool means; second driven spool means; said first driven spool means including tape-engaging means engageable with a loop of tape, and being driven in a winding direction to wind said tape in a doubled-back condition on said spool means, a first section of said doubled-back tape being wound from said information-conveying means and a second section of said doubled-back tape being wound from said second driven spool means, and being moveable in an unwinding direction to feed said first tape section to said second driven spool means and to feed said second tape section to said information-conveying means; said second driven spool means including tape-engaging means engageable with a loop of tape and being driven in a winding direction to wind said tape in a doubled-back condition to wind said first section from said first driven spool means and to wind said second section from said information-conveying means, and being moveable in an unwinding direction to feed said first tape section to said information-conveying means and to feed said second section to said first driven spool means; means for changing direction of each of said first and second spool means from said winding to said unwinding direction when said tape is fully wound thereon whereupon a first loop of tape engageable with the empty spool means is formed; means for changing direction of each of said first and second spool means from said unwinding to winding direction when said tape is fully unwound therefrom whereupon a second loop of tape engageable with the empty spool means is formed; means to direct a first airstream towards said first tape loop to engage said loop with said empty spool means for winding said tape thereon; and means to direct a second airstream towards said second tape loop to engage said loop with said empty spool means for winding said tape thereon.

2. Tape-winding apparatus according to claim 1 including first driving means to drive said first spool means in said winding direction, means for disengaging said first driving means from said first spool means when said tape is fully unwound from said second spool means whereupon said first spool means is moved in said unwinding direction by the action of said tape-advancing means, second driving means to drive said second spool means in said winding direction; and means for disengaging said second driving means from said second spool means when said tape is fully unwound from said second spool means when said tape is fully unwound from said first spool means whereupon said first spool means is moved in said unwinding direction by the action of said tape-advancing means.

3. Tape-winding apparatus according to claim 2 wherein each of said disengaging means comprises means responsive to an airstream flowing through an aperture provided respectively in said first and second spool means.

4. Tape-winding apparatus according to claim 1 including first and second driving means to drive said first and second spools and each having a first operative position to drive said spool means in said winding direction and a second operative position to drive said spool means in said unwinding direction.

5. Tape-winding apparatus according to claim 4 including means for moving said first and second driving means between said first and second operative positions, said moving means being responsive to an airstream flowing through an aperture provided respectively in said first and second spool means.

6. Tape-winding apparatus according to claim 1 including a shaft for rotating each of said first and second spool means, means to rotate said shafts in a single direction, means for engaging said first and second spool means to a respective shaft and permitting said spool means to be rotated thereon in a direction opposite to said shaft rotation by the action of said tape-advancing means, and torsion spring means to initiate rotation of said first and second spool means upon a change in direction of rotation thereof.

7. Tape-winding apparatus according to claim 1 wherein said first and second spool means each comprises torsion spring means to engage a spool for rotation upon a change in direction of rotation thereof.

8. Tape-winding apparatus according to claim 1 wherein said first and second spool means comprise tape-engaging means including a tape-engaging arm moveable from a first position engaging said tape for winding on said spool means to a second position out of engagement with said tape to permit removal thereof from said spool means.

9. Tape-winding apparatus according to claim 8 wherein said tape-engaging arm is moved out of engagement with said tape by magnetic means.

10. Tape-winding apparatus according to claim 8 wherein said tape-engaging arm is moved out of engagement with said tape by cam means.